United States Patent
Hsiao et al.

(10) Patent No.: US 9,810,937 B2
(45) Date of Patent: Nov. 7, 2017

(54) TRANSPARENT DISPLAY PANEL AND COLOR FILTER SUBSTRATE THEREOF

(71) Applicant: Shenzhen China Star Optoelectronics Technology Co., Ltd., Guangdong (CN)

(72) Inventors: Yu-Chun Hsiao, Guangdong (CN); Shih Hsiang Chen, Guangdong (CN); Guofu Tang, Guangdong (CN); Quan Li, Guangdong (CN); Chengling Lv, Guangdong (CN); Chaofan Guo, Guangdong (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 71 days.

(21) Appl. No.: 14/407,985

(22) PCT Filed: Nov. 18, 2014

(86) PCT No.: PCT/CN2014/091348
§ 371 (c)(1),
(2) Date: Aug. 25, 2015

(87) PCT Pub. No.: WO2016/074256
PCT Pub. Date: May 19, 2016

(65) Prior Publication Data
US 2016/0139456 A1    May 19, 2016

(30) Foreign Application Priority Data
Nov. 13, 2014   (CN) .......................... 2014 1 0640164

(51) Int. Cl.
*G02F 1/1335*     (2006.01)
*G02B 5/20*       (2006.01)

(52) U.S. Cl.
CPC ....... *G02F 1/133514* (2013.01); *G02B 5/201* (2013.01); *G02F 1/133504* (2013.01)

(58) Field of Classification Search
CPC .................................................. G02F 1/133514
USPC ............................................ 349/106; 359/891
See application file for complete search history.

(56) References Cited

U.S. PATENT DOCUMENTS

| | | | |
|---|---|---|---|
| 6,068,953 A | | 5/2000 | Matsumoto et al. |
| 2004/0169793 A1* | | 9/2004 | Ino .................... G02F 1/133514 349/106 |
| 2011/0109851 A1* | | 5/2011 | Ono ................... G02F 1/133514 349/106 |
| 2014/0211131 A1 | | 7/2014 | Choi et al. |

(Continued)

FOREIGN PATENT DOCUMENTS

| CN | 102253527 | 11/2011 |
|---|---|---|
| CN | 103217832 | 7/2013 |

(Continued)

*Primary Examiner* — Thanh-Nhan P Nguyen

(57) ABSTRACT

A transparent display panel and a color filter substrate are proposed. The color filter substrate includes a substrate, a color resistant layer disposed on a color resistant section of the substrate, a transparent material layer disposed on a transparent section of the substrate and comprising transparent units, a protective layer disposed on both of the color resistant layer and the transparent material layer, and an electrode layer disposed on the protective layer. Users can see components behind the transparent display panel easily and clearly.

17 Claims, 4 Drawing Sheets

(56) References Cited

U.S. PATENT DOCUMENTS

2015/0153623 A1 6/2015 Shi
2015/0331281 A1 11/2015 Liu et al.

FOREIGN PATENT DOCUMENTS

| CN | 103969862 | 8/2014 |
| CN | 103995390 | 8/2014 |
| JP | 2002-107709 | 4/2002 |

\* cited by examiner

TRANSPARENT DISPLAY PANEL AND COLOR FILTER SUBSTRATE THEREOF

RELATED APPLICATIONS

This application is a National Phase of PCT Patent Application No. PCT/CN2014/091348 having International filing date of Nov. 18, 2014, which claims the benefit of priority of Chinese Patent Application No. 201410640164.0 filed on Nov. 13, 2014. The contents of the above applications are all incorporated by reference as if fully set forth herein in their entirety.

BACKGROUND OF THE INVENTION

1. Field of the Invention

The present invention relates to the technological field of display, and more particularly, to a transparent display panel and a color filter (CF) substrate thereof.

2. Description of the Prior Art

A user of a conventional transparent display panel can see components behind the conventional transparent display panel since the panel is transparent.

A conventional transparent display panel may comprise a liquid crystal display (LCD) or an organic light emitting diode (OLED).

When the transparent display panel is an LCD panel, the components or units behind the display panel cannot be clearly seen by the users because of a black matrix (BM) layer disposed on the CF substrate.

Therefore, it is necessary to propose a new technical plan for solving the technical problem occurring in the conventional technology.

SUMMARY OF THE INVENTION

An object of the present invention is to provide a transparent display panel and a CF substrate for the transparent display panel. The users of the transparent display panel can see the components behind the transparent display panel clearly.

According to an embodiment of the present invention, a color filter (CF) substrate, comprises: a substrate, comprising a color resistant section and a transparent section, and at least one part of the transparent section located between an area of any two of the adjacent color resistant sections; a color resistant layer, disposed on the color resistant section, and comprising one or more color resistant units; a transparent material layer, disposed on the transparent section, and comprising two transparent units; a protective layer, disposed on both of the color resistant layer and the transparent material layer; and an electrode layer, disposed on the protective layer. The transparent unit comprises a light transmittance, the light transmittance is the ratio of light shining on the transparent unit to light penetrating the transparent unit, and a value of the light transmittance ranges from 10% and 99.9%. The transparent unit surrounds the color resistant unit. A first side of the transparent unit is wrinkle-shaped, and the first side of the transparent unit is perpendicular to a flat surface where the surface is located.

In one aspect of the present invention, at least two of the transparent units are connected.

According to another embodiment of the present invention, a color filter (CF) substrate, comprises: a substrate, comprising a color resistant section and a transparent section, and at least one part of the transparent section located between an area of any two of the adjacent color resistant sections; a color resistant layer, disposed on the color resistant section, and comprising one or more color resistant units; a transparent material layer, disposed on the transparent section, and comprising two transparent units; a protective layer, disposed on both of the color resistant layer and the transparent material layer; and an electrode layer, disposed on the protective layer.

In one aspect of the present invention, the transparent unit comprises a light transmittance, the light transmittance is the ratio of light shining on the transparent unit to light penetrating the transparent unit, and a value of the light transmittance ranges from 10% and 99.9%.

In another aspect of the present invention, the transparent unit surrounds the color resistant unit.

In another aspect of the present invention, at least two of the transparent units are connected.

In another aspect of the present invention, a first side of the transparent unit is wrinkle-shaped, and the first side of the transparent unit is perpendicular to a flat surface where the surface is located.

In another aspect of the present invention, the first side of the transparent unit is a wrinkle-shaped side, and the wrinkle-shaped surface is used for preventing light supplied to a first pixel from shining on a second pixel.

In another aspect of the present invention, the wrinkle-shaped surface is coupled to the protective layer fulfilling an area between the transparent unit and the color resistant layer.

In still another aspect of the present invention, the wrinkle-shaped surface is coupled to the color resistant unit.

In yet another aspect of the present invention, the wrinkle-shaped surface is formed by etching or laser-cutting the first side of the transparent unit.

According to another embodiment of the present invention, a transparent display panel, comprises a transparent backlight source, a thin film transistor array substrate, a liquid crystal layer, and a color filter (CF) substrate. The CF substrate comprises: a substrate, comprising a color resistant section and a transparent section, and at least one part of the transparent section located between an area of any two of the adjacent color resistant sections; a color resistant layer, disposed on the color resistant section, and comprising one or more color resistant units; a transparent material layer, disposed on the transparent section, and comprising two transparent units; a protective layer, disposed on both of the color resistant layer and the transparent material layer; and an electrode layer, disposed on the protective layer.

In one aspect of the present invention, the transparent unit comprises a light transmittance, the light transmittance is the ratio of light shining on the transparent unit to light penetrating the transparent unit, and a value of the light transmittance ranges from 10% and 99.9%.

In another aspect of the present invention, the transparent unit surrounds the color resistant unit.

In another aspect of the present invention, at least two of the transparent units are connected.

In another aspect of the present invention, a first side of the transparent unit is wrinkle-shaped, and the first side of the transparent unit is perpendicular to a flat surface where the surface is located.

In another aspect of the present invention, the first side of the transparent unit is a wrinkle-shaped side, and the wrinkle-shaped surface is used for preventing light supplied to a first pixel from shining on a second pixel.

In another aspect of the present invention, the wrinkle-shaped surface is coupled to the protective layer fulfilling an area between the transparent unit and the color resistant layer.

In still another aspect of the present invention, the wrinkle-shaped surface is coupled to the color resistant unit.

In yet another aspect of the present invention, the wrinkle-shaped surface is formed by etching or laser-cutting the first side of the transparent unit.

Compared with the conventional technology, the present invention allows the users of the transparent display panel to see the components behind the transparent display panel clearly.

These and other features, aspects and advantages of the present disclosure will become understood with reference to the following description, appended claims and accompanying figures.

DETAILED DESCRIPTION OF THE PREFERRED EMBODIMENTS

The term "embodiment" used in this description refers to an example, a demonstration, or an illustration. In addition, the two indefinite articles "a" and "an" used in this description and claims are generally understood as "one" or "more/a plurality of" unless a specific single form is pointed out or is determined in the context.

The transparent display panel provided by the present invention can be, for example, an LCD panel.

The transparent display panel comprises a transparent backlight source, a thin film transistor (TFT) array substrate, a liquid crystal layer, and a color filter (CF) substrate. The TFT array substrate and the CF substrate are overlapped, and then a liquid crystal cell (LC cell) is formed. The liquid crystal layer is disposed inside the LC cell. That is, the liquid crystal layer is disposed on an area between the TFT array substrate and the CF substrate. The liquid crystal layer and the transparent backlight source are overlapped, and then the transparent display panel is formed.

Figure 1:
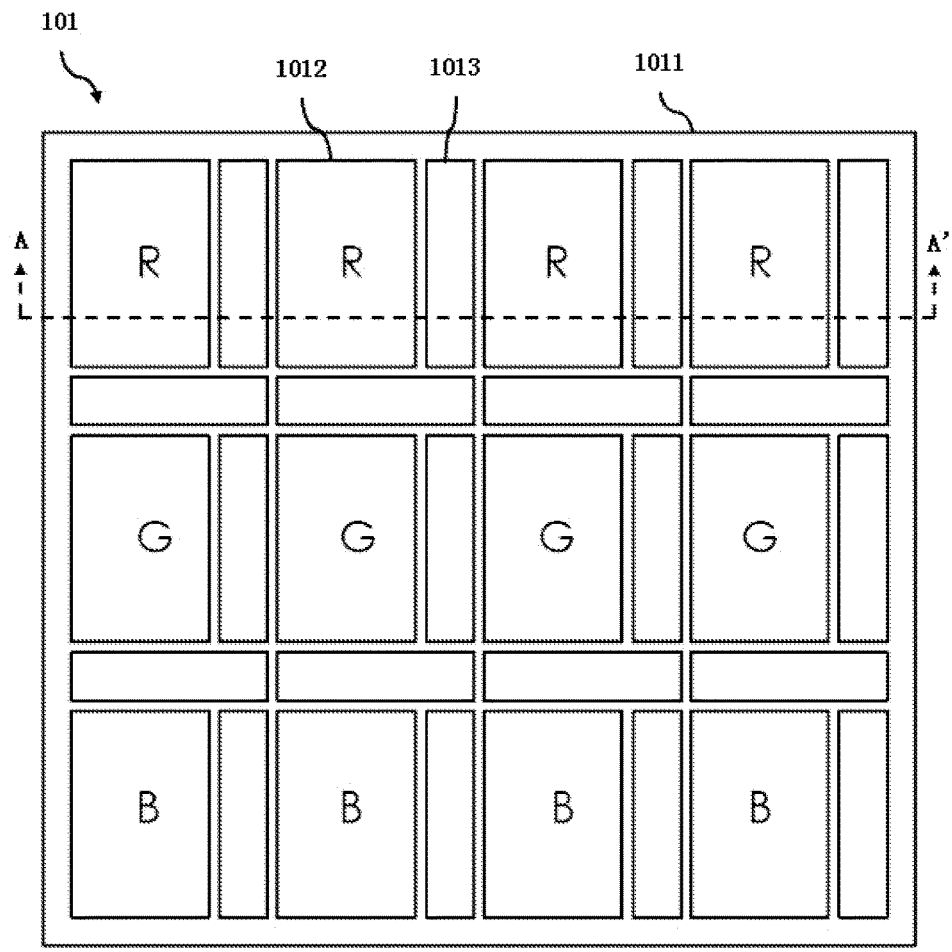
FIG. 1 is a schematic diagram of a CF substrate according to a first embodiment of the present invention.
Figure 2:
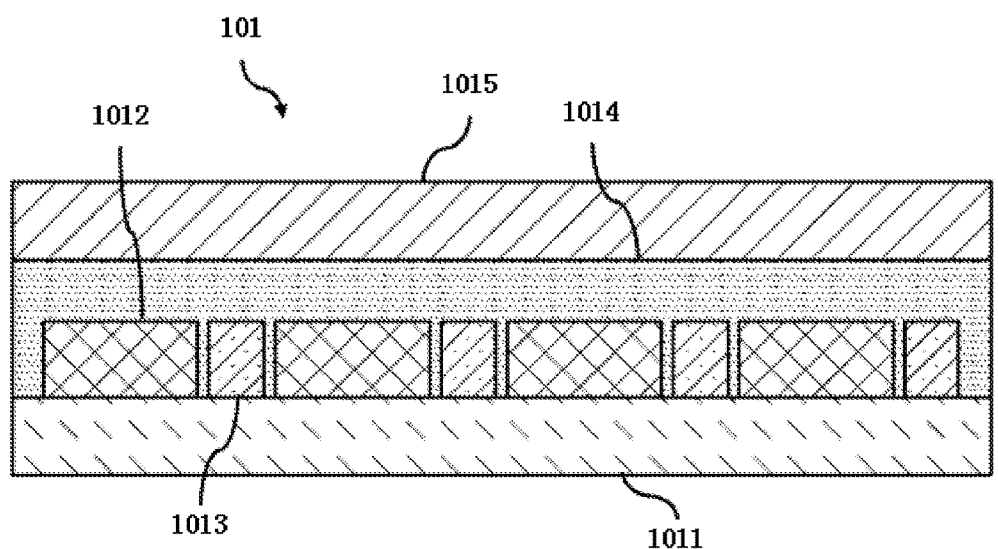
FIG. 2 is a schematic diagram of the CF substrate across an A-A' line shown in FIG. 1.

Please refer to FIG. 1 and FIG. 2. FIG. 1 is a schematic diagram of a CF substrate 101 according to a first embodiment of the present invention. FIG. 2 is a schematic diagram of the CF substrate 101 across an A-A' line shown in FIG. 1.

The CF substrate 101 comprises a substrate 1011, a color resistant layer, a transparent material layer, a protective layer 1014, and an electrode layer 1015.

The substrate 1011 comprises a color resistant section and a transparent section. At least one part of the transparent section is located between the area of any two of the adjacent color resistant sections.

The color resistant layer is disposed on the color resistant section. The color resistant layer comprises one or more color resistant units 1012. The color resistant unit 1012 comprises a red color resistant (R color resistant), a green color resistant (G color resistant), and a blue color resistant (B color resistant).

The transparent material layer is disposed on the transparent section. The transparent section comprises at least two transparent units 1013.

The protective layer 1014 is disposed on both of the color resistant layer and the transparent material layer. The protective layer 1014 is transparent.

The electrode layer 1015 is disposed on the protective layer 1014. The electrode layer 1015 is a transparent electrode layer.

The transparent unit 1013 comprises a light transmittance in this embodiment. The light transmittance indicates the ratio of the light shining on the transparent unit 1013 to the light penetrating the transparent unit 1013. The value of the light transmittance is within the range of 10% and 99.9%. For example, the value of the light transmittance may be 11.4%, 14.7%, 15.3%, 17.8%, 19.1%, 22.8%, 24.7%, 26.4%, 29.3%, 32.2%, 36.1%, 39.5%, 42.3%, 43.4%, 46.8%, 48.2%, 50.9%, 63.8%, 66.1%, 69.2%, 72.1%, 75.4%, 77.6%, 79.7%, 82.0%, 84.5%, 86.1%, 88.9%, 90.2%, 93.3%, 95.7%, 97.6%, or 99.9%.

In the present embodiment, the transparent unit 1013 surrounds the color resistant unit 1012. That is, the transparent unit 1013 surrounds the R color resistant, or the G color resistant, or the B color resistant. In other words, a color resistant unit 1012 is disposed between any two of the transparent units 1013.

In this way, the quantity of light that is required to penetrate the transparent display panel increases effectively and obviously. Thus, the users can see the components behind the transparent display panel easily and clearly.

Figure 3:
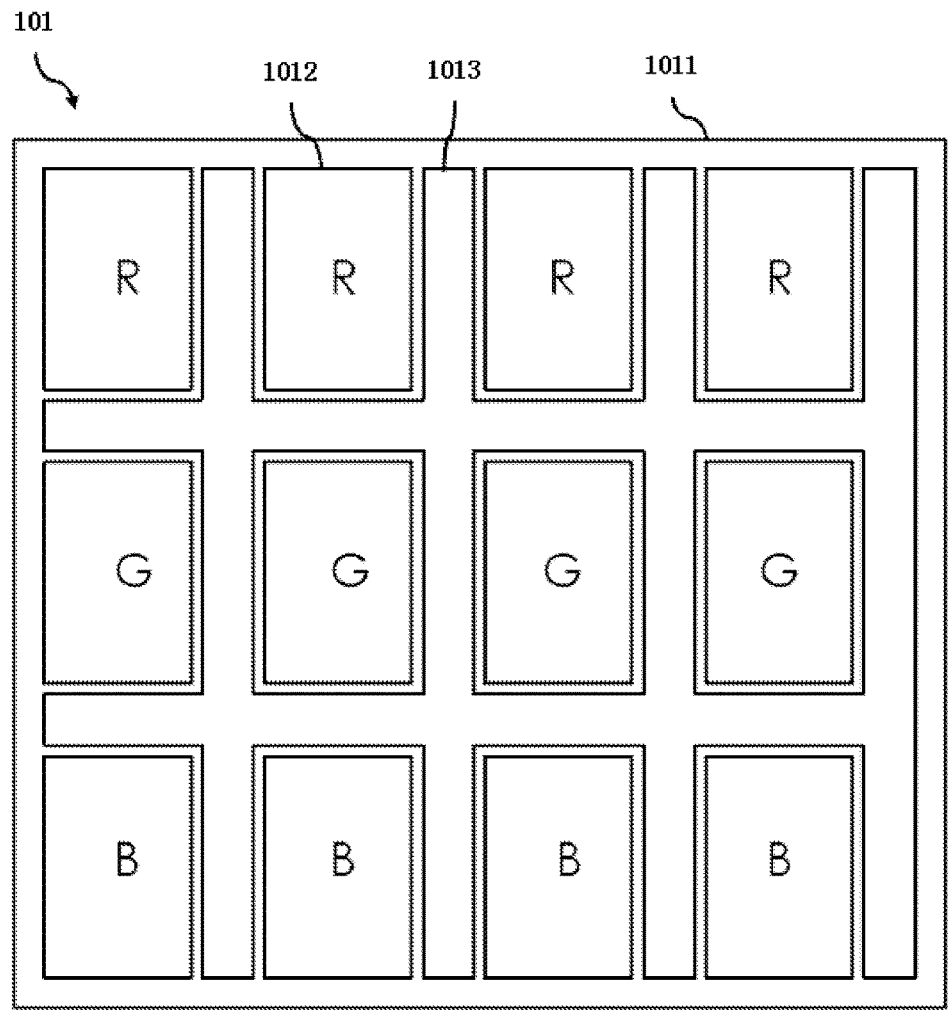
FIG. 3 is a schematic diagram showing a CF substrate according to a second embodiment of the present invention.

Please refer to FIG. 3. FIG. 3 is a schematic diagram showing a CF substrate 101 according to a second embodiment of the present invention. The second embodiment and the first embodiment are alike basically. The difference between the first embodiment and the second embodiment is described below.

At least two transparent units 1013 are connected in this embodiment.

The connection of the at least two transparent units 1013 helps the reduction of a loss of the light penetrating the transparent display panel. In addition, the connection of the at least two transparent units 1013 helps the incident light "circulate" inside the at least two transparent units 1013. In this way, the transparent display panel has higher contrast and larger brightness.

A transparent material layer formed by the at least two transparent units 1013 is grid-shaped. A color resistant unit 1012 is located in the gird of the transparent material layer. In this way, a combinational layer formed by the transparent material layer and a color resistant layer is very solid.

Figure 4:
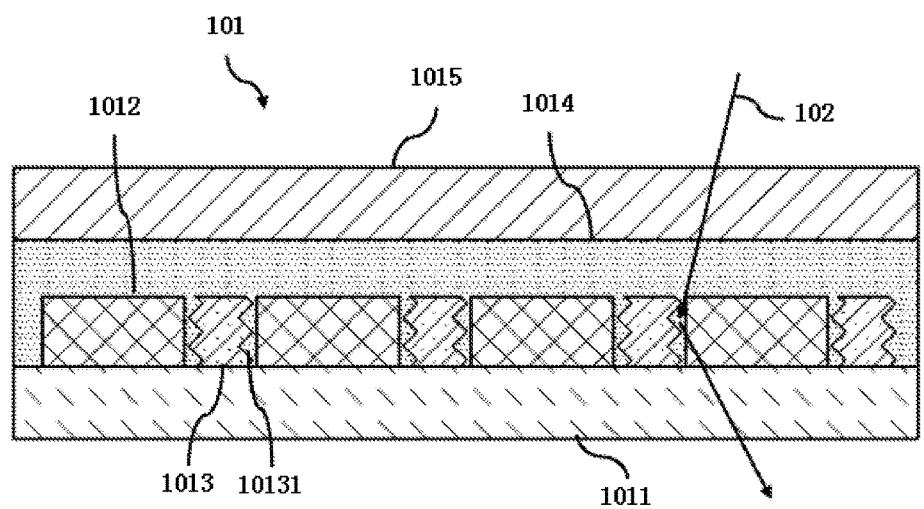
FIG. 4 is a schematic diagram showing a CF substrate according to a third embodiment of the present invention.

Please refer to FIG. 4. FIG. 4 is a schematic diagram showing a CF substrate 101 according to a third embodiment of the present invention. The third embodiment and the former two embodiments are alike basically. The difference between the third embodiment and the former two embodiments is described below.

In this embodiment, a first side of the transparent unit 1013 is wrinkle-shaped, and the first side of the transparent unit 1013 is perpendicular to a flat surface where a surface 1011 is located. In other words, the first side of the transparent unit 1013 is a wrinkle-shaped surface 10131. The wrinkle-shaped surface 10131 is used for preventing light leakage. More specifically, the wrinkle-shaped surface 10131 is used for preventing the light supplied to a first pixel 102 from shining on a second pixel. Thus, the images avoid being distorted when being shown.

There are many wrinkles or bents on the wrinkle-shaped surface 10131. When the light supplied to the first pixel 102 shines on the wrinkles or bents, some of the light supplied to the first pixel 102 will be absorbed/consumed. In other words, the light supplied to the first pixel 102 will flee much less.

Some of the light emitted into the transparent unit 1013 through the wrinkle-shaped surface 10131 is absorbed/consumed by the wrinkle-shaped surface 10131 in another side. Thus, the light supplied to the first pixel 102 cannot be emitted into the second pixel.

Preferably, two adjacent wrinkles or bents on the wrinkle-shaped surface 10131 form an angle of 90 degrees. When the light supplied to the first pixel 102 shines on the wrinkle-shaped surface 10131, it is easier for the light 102 to return according to the same route taken by the light 102 originally. This is, the amount of the light is the same as the amount of the light supplied to the first pixel 102.

In this embodiment, the wrinkle-shaped surface 10131 is coupled to the protective layer 1014 fulfilling an area between the transparent unit 1013 and the color resistant unit 1012. Or, the wrinkle-shaped surface 10131 is coupled to the color resistant unit 1012. In this way, a combinational layer formed by the color resistant unit 1012 and the transparent unit 1013 is very solid. The transparent unit 1013 will not be squashed when a user touches or presses the transparent display panel.

The wrinkle-shaped surface 10131 is formed by etching or laser-cutting the first side of the transparent unit 1013. Both of the transparent unit 1013 and the color resistant unit 1012 are disposed on the substrate 1011 in the process of forming the color resistant layer and the transparent material layer on the substrate 1011 while the transparent unit 1013 is previous to the color resistant unit 1012 in formation. The wrinkle-shaped surface 10131 is formed by etching or laser-cutting the first side of the transparent unit 1013 in a corresponding space to the color resistant section before the color resistant unit 1012 is formed.

The transparent unit 1013 provided by the present embodiment replaces the conventional black matrix (BM) layer. Since the display panel is transparent, the users can see the components behind the display panel easily and clearly. Besides, the transparent unit 1013 comprises the wrinkle-shaped surface 10131, so the problem that the light is leaked due to the BM layer can be successfully solved.

Moreover, despite one or more implementations relative to the present disclosure being illustrated and described, equivalent alterations and modifications will occur to others skilled in the art upon reading and understanding this specification and the annexed drawings. The present disclosure comprises such modifications and variations, and is to be limited only by the terms of the appended claims. In particular, regarding the various functions performed by the above described components, the terms used to describe such components (i.e. elements, resources, etc.) are intended to correspond (unless otherwise indicated) to any component, which performs the specified function of the described component (i.e., that is, functionally equivalent), even though not structurally equivalent to the disclosed structure which performs the function in the illustrated implementations of the disclosure. In addition, although a particular feature of the disclosure may have been disclosed with respect to only one of several implementations, such a feature may be combined with one or more other features of the other implementations as may be desired and advantageous for any given or particular application. Also, to the extent that the terms "including", "includes", "having", "has", "with", or variants thereof are used in the detailed description or in the claims, such terms are intended to be inclusive in a manner similar to the term "comprising".

While the present invention has been described in connection with what is considered the most practical and preferred embodiments, it is understood that this invention is not limited to the disclosed embodiments but is intended to cover various arrangements made without departing from the scope of the broadest interpretation of the appended claims.

What is claimed is:

1. A color filter (CF) substrate, comprising:
   a substrate, comprising a color resistant section and a transparent section, and at least one part of the transparent section located between an area of any two of the adjacent color resistant sections;
   a color resistant layer, disposed on the color resistant section, and comprising one or more color resistant units;
   a transparent material layer, disposed on the transparent section, and comprising two transparent units;
   a protective layer, disposed on both of the color resistant layer and the transparent material layer; and
   an electrode layer, disposed on the protective layer,
   wherein the transparent unit comprises a light transmittance, the light transmittance is the ratio of light shining on the transparent unit to light penetrating the transparent unit, and a value of the light transmittance ranges from 10% and 99.9%;
   the transparent unit surrounds the color resistant unit;
   a first side of the transparent unit is wrinkle-shaped, and the first side of the transparent unit is perpendicular to a flat surface where the surface is located.

2. The CF substrate as claimed in claim 1, wherein at least two of the transparent units are connected.

3. A color filter (CF) substrate, comprising:
   a substrate, comprising a color resistant section and a transparent section, and at least one part of the transparent section located between an area of any two of the adjacent color resistant sections;
   a color resistant layer, disposed on the color resistant section, and comprising one or more color resistant units;
   a transparent material layer, disposed on the transparent section, and comprising at least two transparent units;
   a protective layer, disposed on both of the color resistant layer and the transparent material layer; and
   an electrode layer, disposed on the protective layer,
   wherein the transparent unit surrounds the color resistant unit,
   wherein the transparent unit comprises a light transmittance, the light transmittance is the ratio of light shining on the transparent unit to light penetrating the transparent unit, and a value of the light transmittance ranges from 10% and 99.9%.

4. The CF substrate as claimed in claim 3, wherein at least two of the transparent units are connected.

5. The CF substrate as claimed in claim 3, wherein a first side of the transparent unit is wrinkle-shaped, and the first side of the transparent unit is perpendicular to a flat surface where the surface is located.

6. The CF substrate as claimed in claim 5, wherein the first side of the transparent unit is a wrinkle-shaped side, and the wrinkle-shaped surface is used for preventing light supplied to a first pixel from shining on a second pixel.

7. The CF substrate as claimed in claim 6, wherein the wrinkle-shaped surface is coupled to the protective layer fulfilling an area between the transparent unit and the color resistant layer.

8. The CF substrate as claimed in claim 6, wherein the wrinkle-shaped surface is coupled to the color resistant unit.

9. The CF substrate as claimed in claim 6, wherein the wrinkle-shaped surface is formed by etching or laser-cutting the first side of the transparent unit.

10. A transparent display panel, comprising:
   a transparent backlight source;
   a thin film transistor array substrate;
   a liquid crystal layer; and
   a color filter (CF) substrate, comprising:
      a substrate, comprising a color resistant section and a transparent section, and at least one part of the transparent section located between an area of any two of the adjacent color resistant sections;
      a color resistant layer, disposed on the color resistant section, and comprising one or more color resistant units;
      a transparent material layer, disposed on the transparent section, and comprising at least two transparent units;
      a protective layer, disposed on both of the color resistant layer and the transparent material layer; and
      an electrode layer, disposed on the protective layer,
      wherein a first side of the transparent unit is wrinkle-shaped, and the first side of the transparent unit is perpendicular to a flat surface where the surface is located.

11. The transparent display panel claimed in claim 10, wherein the transparent unit comprises a light transmittance, the light transmittance is the ratio of light shining on the transparent unit to light penetrating the transparent unit, and a value of the light transmittance ranges from 10% and 99.9%.

12. The transparent display panel as claimed in claim 10, wherein the transparent unit surrounds the color resistant unit.

13. The transparent display panel as claimed in claim 12, wherein at least two of the transparent units are connected.

14. The transparent display panel as claimed in claim 10, wherein the first side of the transparent unit is a wrinkle-shaped side, and the wrinkle-shaped surface is used for preventing light supplied to a first pixel from shining on a second pixel.

15. The transparent display panel as claimed in claim 14, wherein the wrinkle-shaped surface is coupled to the protective layer fulfilling an area between the transparent unit and the color resistant layer.

16. The transparent display panel as claimed in claim 14, wherein the wrinkle-shaped surface is coupled to the color resistant unit.

17. The transparent display panel as claimed in claim 14, wherein the wrinkle-shaped surface is formed by etching or laser-cutting the first side of the transparent unit.

* * * * *